(12) United States Patent
Qian et al.

(10) Patent No.: US 8,451,754 B2
(45) Date of Patent: *May 28, 2013

(54) METHODS, APPARATUS AND ARTICLES OF MANUFACTURE TO MANAGE ROUTING IN NETWORKS

(75) Inventors: Zhiqiang Qian, Holmdel, NJ (US); Michael Zinnikas, North Brunswick, NJ (US); Jackson Liu, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/026,948

(22) Filed: Feb. 14, 2011

(65) Prior Publication Data

US 2011/0138029 A1 Jun. 9, 2011

Related U.S. Application Data

(63) Continuation of application No. 12/339,989, filed on Dec. 19, 2008, now Pat. No. 7,911,976.

(51) Int. Cl.
*H04L 12/28* (2006.01)

(52) U.S. Cl.
USPC .......................................... 370/254

(58) Field of Classification Search
None
See application file for complete search history.

(56) References Cited

U.S. PATENT DOCUMENTS

| | | |
|---|---|---|
| 7,400,584 B2 | 7/2008 | Cayla |
| 7,484,004 B2 | 1/2009 | Pelavin et al. |
| 7,533,166 B2 | 5/2009 | Beyda |
| 7,583,589 B2 | 9/2009 | Bryant et al. |
| 2003/0118024 A1 | 6/2003 | Lee et al. |
| 2003/0179707 A1 | 9/2003 | Bare |
| 2004/0078787 A1 | 4/2004 | Borek et al. |
| 2005/0195835 A1 | 9/2005 | Savage et al. |
| 2007/0280120 A1 | 12/2007 | Wong et al. |
| 2008/0037560 A1 | 2/2008 | Jia et al. |
| 2008/0298250 A1 | 12/2008 | Larsson |

OTHER PUBLICATIONS

United States Patent and Trademark Office, "Notice of Allowance" issued in connection with U.S. Appl. No. 12/339,989, mailed Nov. 15, 2010 (9 pages).
United States Patent and Trademark Office, "Final Office Action" issued in connection with U.S. Appl. No. 12/339,989, mailed Sep. 28, 2010 (12 pages).
United States Patent and Trademark Office, "Non-Final Office Action" issued in connection with U.S. Appl. No. 12/339,989, mailed Apr. 2, 2010 (26 pages).

*Primary Examiner* — Chirag Shah
*Assistant Examiner* — Amar Persaud
(74) *Attorney, Agent, or Firm* — Hanley, Flight & Zimmerman, LLC

(57) ABSTRACT

Example methods, apparatus and articles to manage routing in networks are disclosed. A disclosed example method includes obtaining a first interior gateway routing protocol route selection metric associated with a first router and a second interior gateway routing protocol route selection metric associated with a second router communicatively coupled to the first router, detecting whether a mismatch exists between the first and second first interior gateway routing protocol route selection metrics, determining, using a Bellman-Ford algorithm, a target interior gateway routing protocol route selection metric when the mismatch is detected, and transmitting the target interior gateway routing protocol route selection metric to at least one of the first and second routers.

15 Claims, 5 Drawing Sheets

400

METHODS, APPARATUS AND ARTICLES OF MANUFACTURE TO MANAGE ROUTING IN NETWORKS

RELATED APPLICATION

This patent arises from a continuation of U.S. patent application Ser. No. 12/339,989, now U.S. Pat. No. 7,911,976, which is entitled "Method and Apparatus For Managing Routing in A Network" and was filed on Dec. 19, 2008. U.S. application Ser. No. 12/339,989 is hereby incorporated by reference in its entirety.

FIELD OF THE DISCLOSURE

The present disclosure relates generally to communication systems and more specifically to a method and apparatus for managing routing in a network.

BACKGROUND

Networks utilize various equipment, including routers, switches and so forth, to manage and transmit communication of data within the networks. Various routing protocols have been developed to facilitate the selection of paths or routing of traffic or data between network elements to reach an end point.

DETAILED DESCRIPTION

Figure 1:
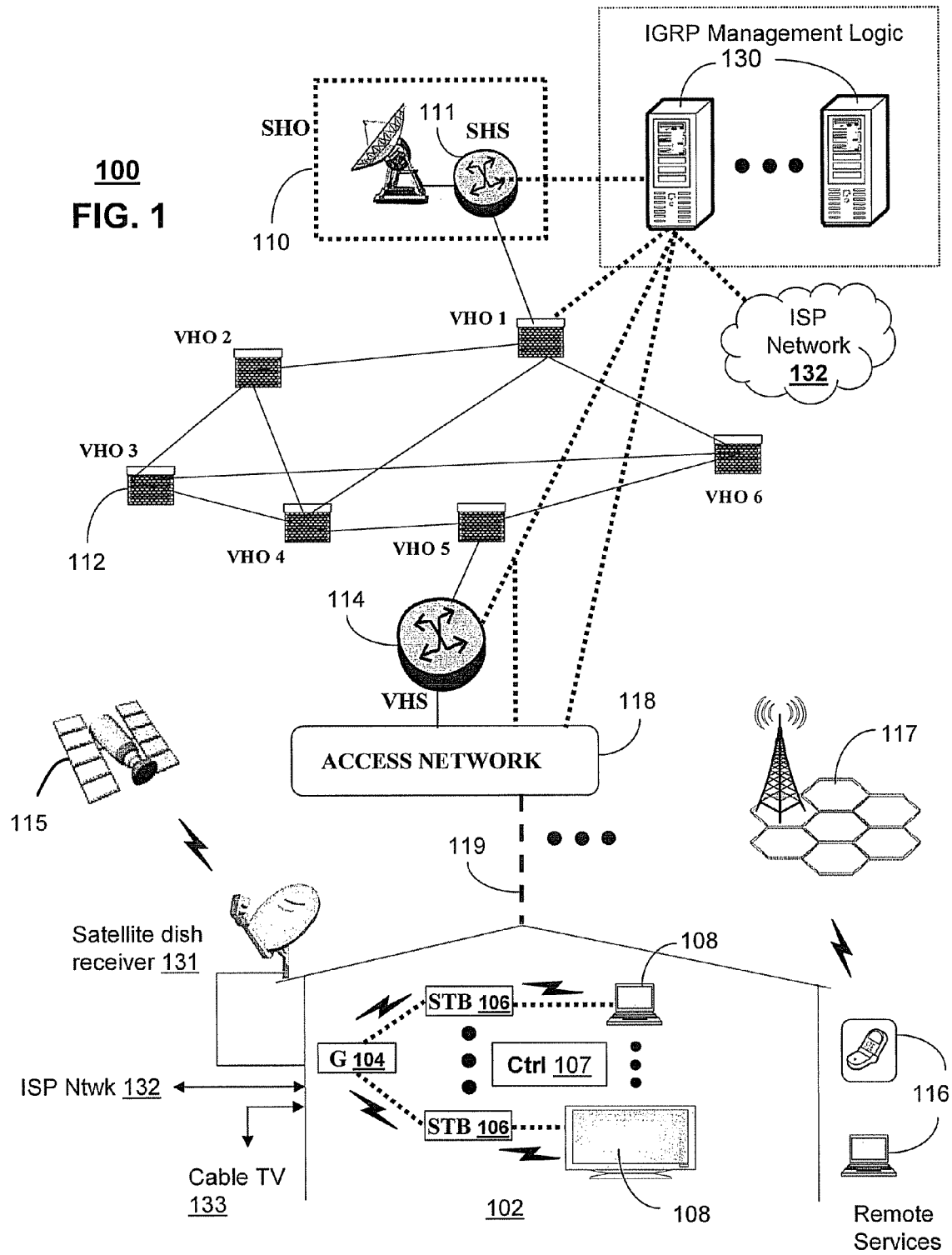
FIG. 1 depicts an illustrative embodiment of a communication system.

One embodiment of the present disclosure can entail a computer-readable storage medium where the storage medium includes computer instructions to determine a network topology comprising a first router and a plurality of second routers where the second routers are interfaced with the first router, determine routing algorithm constants associated with the second routers where the first router and the second routers utilize interior gateway routing protocol, detect a mismatch among the routing algorithm constants, and determine a target algorithm constants when the mismatch is detected.

Another embodiment of the present disclosure can entail a server in communication with a first router, where the server includes a controller to determine routing algorithm constants associated with a plurality of second routers where the second routers are interfaced with the first router and where the first router and the second routers utilize interior gateway routing protocol, detect a mismatch among the routing algorithm constants, and determine a target algorithm constant when the mismatch is detected.

Yet another embodiment of the present disclosure can entail a server in communication with a first network element, where the server includes a controller to determine routing values associated with a plurality of second network elements where the second network elements are interfaced with the first network elements where the first network elements and the second network elements utilize interior gateway routing protocol and where the routing values comprise at least one of routing algorithm constants, service provider routing identifiers, and size of largest deliverable packets, detect a mismatch among the routing values, determine a target routing value when the mismatch is detected, and transmit the target routing value to at least one of the second network elements, where the routing values are adjusted in response to the transmitted routing value to match each other.

Yet another embodiment of the present disclosure can entail a network element operably coupled to a server, the network element including a controller to route network traffic according to interior gateway routing protocol, and adjust a first routing algorithm constant associated with the network element to match a second routing algorithm constant associated with another network element in response to a target algorithm constant received from the server, where the network element and the another network element interface a router having an undesired condition associated therewith.

Yet another embodiment of the present disclosure can entail a method including obtaining network topology information associated with a first network element and a plurality of second network elements where the second network elements are interfaced with the first network elements, determining routing values associated with the second network elements where the routing values comprise at least one of routing algorithm constants, service provider routing identifiers, and size of largest deliverable packets, detecting a mismatch among the routing values, determining a target routing value when the mismatch is detected, and transmitting the target routing value to at least one of the second network elements, where the routing values are adjusted in response to the transmitted routing value to match each other.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In one embodiment, the computing devices 130 can be a routing management system that can include and/or can implement routing service logic for monitoring, troubleshooting and correcting routing in the system 100. For instance, devices 130 can retrieve routing configuration from an inventory system, such as topology information; can analyze configuration data retrieved from neighboring interfaces to a problematic router; can compare various parameters for mismatches. In one embodiment where the system 100 utilizes Interior Gateway Routing Protocol (IGRP) and/or Enhanced Interior Gateway Routing Protocol (EIGRP), devices 130 can determine mismatches for neighboring network elements for parameters including Autonomous System (AS) numbers, Maximum Transmission Unit (MTU) values, and K values. The devices 130 can then correct any mismatches, either in the problem router, the neighboring router (s) or both.

In one embodiment, devices 130 can also verify hold time and hello interval values for these network elements, and determine if these values satisfy predetermined value thresholds and/or dynamic value thresholds (such as calculated based on the current topology, traffic or other conditions determined within a temporal proximity). In another embodiment, the devices 130 can monitor for Retransmission Time Out (RTO) values and/or Smooth Round Trip Time (SRTT) values, and can determine if these values satisfy predetermined and/or dynamic thresholds. In another embodiment, the devices 130 can correct any improper or undesired values, either in the problem router, the neighboring router(s) or both.

The computing devices 130 can monitor, troubleshoot and correct configuration failures or undesired conditions for one or more portions of the system 100, such as the access network, or can be applied to network traffic management for the entire system.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
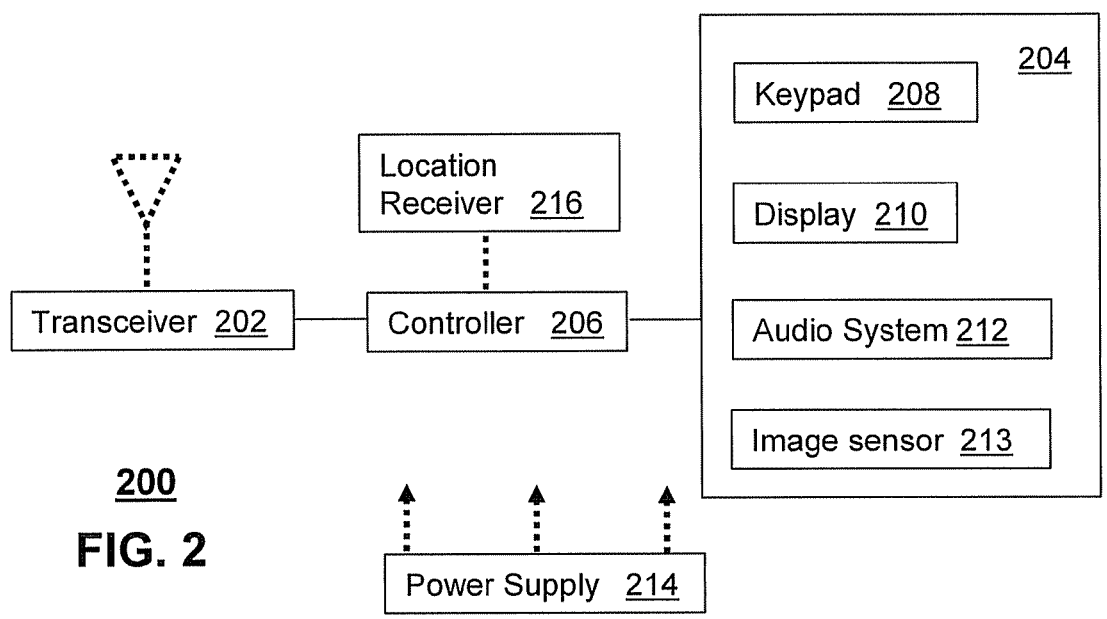
FIG. 2 depicts an illustrative embodiment of a communication device utilized in the communication system of FIG. 1.

FIG. 2 depicts an exemplary embodiment of a communication device 200. Communication 200 can serve in whole or in part as an illustrative embodiment of the communication devices of FIGS. 1-2. The communication device 200 can comprise a wireline and/or wireless transceiver 202 (herein transceiver 202), a user interface (UI) 204, a power supply 214, a location receiver 216, and a controller 206 for managing operations thereof. The transceiver 202 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 202 can also be adapted to support circuit-switched wireline access technologies (such as PSTN), packet-switched wireline access technologies (such as TCPIP, VoIP, etc.), and combinations thereof.

The UI 204 can include a depressible or touch-sensitive keypad 208 with a navigation mechanism such as a roller ball, joystick, mouse, or navigation disk for manipulating operations of the communication device 200. The keypad 208 can be an integral part of a housing assembly of the communication device 200 or an independent device operably coupled thereto by a tethered wireline interface (such as a USB cable) or a wireless interface supporting for example Bluetooth. The keypad 208 can represent a numeric dialing keypad commonly used by phones, and/or a QWERTY keypad with alphanumeric keys. The UI 204 can further include a display 210 such as monochrome or color LCD (Liquid Crystal Display), OLED (Organic Light Emitting Diode) or other suitable display technology for conveying images to an end user of the communication device 200. In an embodiment where the display 210 is touch-sensitive, a portion or all of the keypad 208 can be presented by way of the display.

The UI 204 can also include an audio system 212 that utilizes common audio technology for conveying low volume audio (such as audio heard only in the proximity of a human ear) and high volume audio (such as speakerphone for hands free operation). The audio system 212 can further include a microphone for receiving audible signals of an end user. The audio system 212 can also be used for voice recognition applications. The UI 204 can further include an image sensor 213 such as a charged coupled device (CCD) camera for capturing still or moving images.

The power supply 214 can utilize common power management technologies such as replaceable and rechargeable batteries, supply regulation technologies, and charging system technologies for supplying energy to the components of the communication device 200 to facilitate long-range or short-range portable applications. The location receiver 216 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 202 to also determine a proximity to a cellular, WiFi or Bluetooth access point by common power sensing techniques such as utilizing a received signal strength indicator (RSSI) and/or a signal time of arrival (TOA) or time of flight (TOF). The controller 206 can utilize computing technologies such as a microprocessor, a digital signal processor (DSP), and/or a video processor with associated storage memory such a Flash, ROM, RAM, SRAM, DRAM or other storage technologies.

The communication device 200 can be adapted to perform the functions of the media processor 106, the media devices 108, or the portable communication devices 116 of FIG. 1. It will be appreciated that the communication device 200 can also represent other common devices that can operate in communication systems 100 of FIG. 1 such as a gaming console and a media player.

Figure 3:
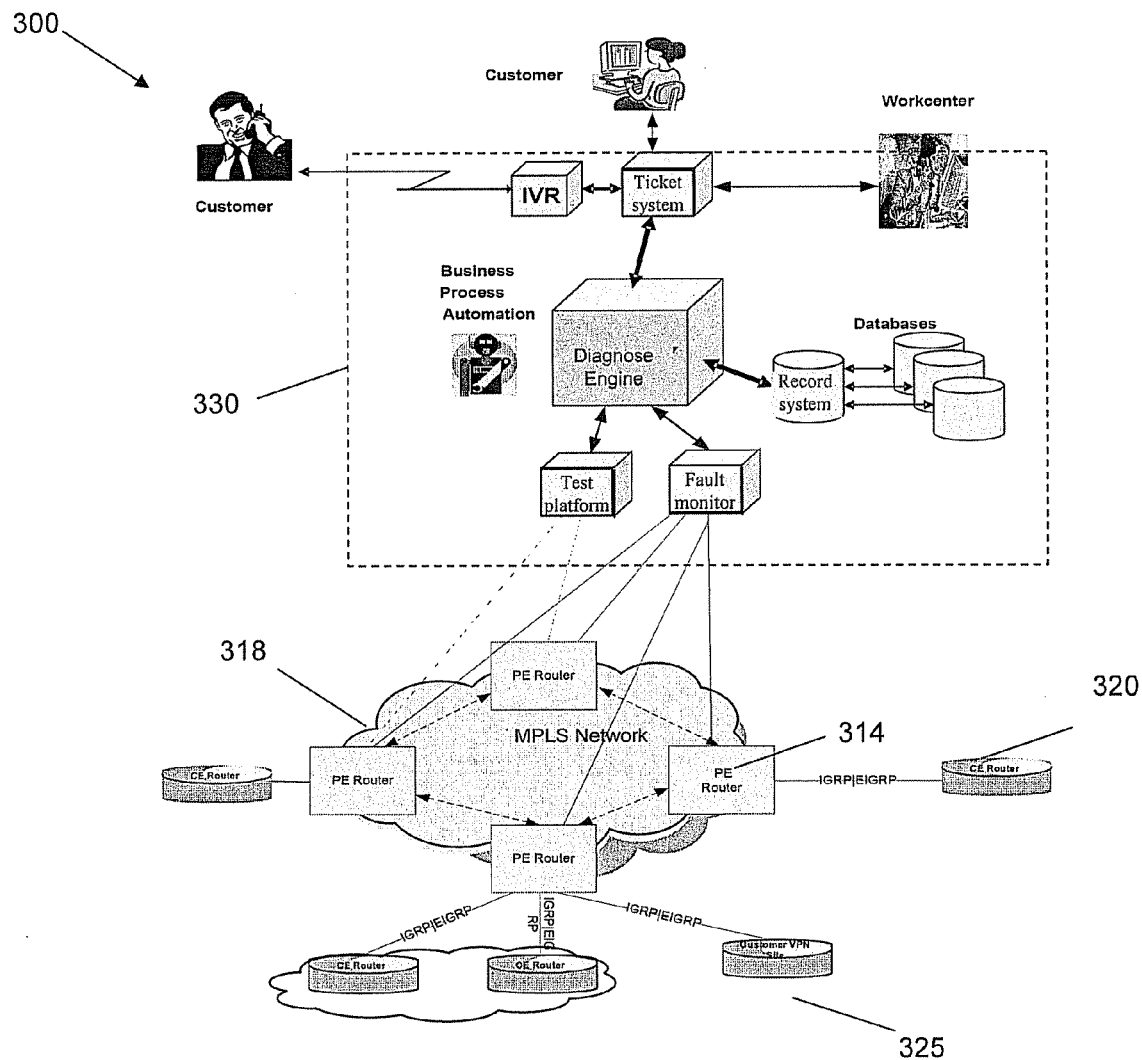
FIG. 3 depicts an illustrative embodiment of a communication system.

FIG. 3 depicts an exemplary embodiment of a communication system 300 for providing communication between end points, including voice, video and other data. Communication system 300 can be overlaid or operably coupled with communication system 100 as another representative embodiment of said communication systems.

System 300 can include one or more provider edge routers 314 in communication with each other in an access network 318, such as a multi protocol label switching network. The access network 318 can be in communication with one or more customer edge routers 320 and/or customer VPN sites 325. The particular number and configuration of the various components that comprise the access network 318 and customer equipment can vary.

The MPLS network 318 can be coupled to a media network, such as the IPTV network shown in FIG. 1 or one or more other media service provider networks including satellite, cable and so forth. A number of network devices, including DSLAM's, service routers and Ethernet switches, can be utilized for transporting the signals throughout the system 300, including through the network 318, and can be provided in various areas of the network(s) including intermediate offices, central offices and neighborhood offices. The system 100, including network 318, can utilize a number of connection structures for providing a communication link with the communication devices, including twisted pair lines, fiber lines and/or wireless connections. In one embodiment, an IMS network can be coupled to or incorporated with the network 318 to facilitate communication. The exemplary embodiments can be performed by a single service provider or vendor, as well as through use of different service providers or vendors, including home and mobile services being different vendors where the service provider associated with the network 318 provides an agreed service coordination of benefit to the user.

System 300 can utilize various protocols, techniques and combinations thereof for communicating data between the network elements, including IGRP and/or EIGRP routing. In one embodiment, the system 300 can utilize IGRP protocol based on a Bellman-Ford algorithm. In another embodiment, a vector of metrics can be employed with the algorithm to characterize paths. In yet another embodiment, rather than picking a single path with the smallest metric, traffic can be split among several paths, whose metrics fall into a specified range. In yet another embodiment, several features can be introduced to provide stability in situations where the topology is changing. For example, the best path can be selected based on a composite metric:

$$[(K1/Be)+(K2*Dc)]r \qquad [1]$$

where K1, K2=constants, Be=unloaded path bandwidth*(1-channel occupancy), Dc=topological delay, and r=reliability. In this example, the path having the smallest composite metric can be the best path. Where there are multiple paths to the same destination, the gateway can route the packets over more than one path. This can be performed in accordance with the composite metric for each data path. For instance, if one path has a composite metric of 1 and another path has a composite metric of 3, three times as many packets may be sent over the data path having the composite metric of 1.

The K value for the IGRP protocol can be one or more of the constants used in the algorithm that assign weight to the various factors of the algorithm, such as bandwidth, load, delay and reliability. In one embodiment, the K value can be an average of the K constants or some other value that is related to or associated with one or more of the K values. In another embodiment, the IGRP protocol can be based on the following algorithm:

$$[(K1*BW)+((K2*BW)/(256-Load))+(K3*Delay)]\\ *RELIABILITY \qquad [2]$$

where K1-K5 are constants, BW=bandwidth, and where the RELIABILITY is equal to [K5/(r+K4)] and is only applied when K5 does not equal zero. In a default setting, the following K value can be applied: K1=K3=1 and K2=K4=K5=0.

System 300 can include a routing management system or proxy 330. Proxy 330 can comprise a number of different components including controller(s), communication interface(s) and memory. In the embodiment of system 300, the proxy 330 is shown as a centralized system, but the present disclosure contemplates the proxy being a decentralized system, including sharing one or more components of other systems, and utilizing various techniques for facilitating decentralized control, such as a master-slave arrangement between various components of the proxy.

In one embodiment, proxy 330 can include a rules or diagnose engine, a platform, and/or a fault monitoring system or platform for monitoring of IGRP/EIGRP routing configuration data associated with the network elements of system 300, such as routers 314. The proxy 330 can analyze the configuration data, such as the K value associated with a problem router and the K values associated with the neighboring routers, and can implement adjustments to the data, such as for the problem router, the neighboring routers or both.

In another embodiment, the rules engine can be in communication with a database of records to facilitate analysis of the routing configuration data, such as by storing topology information associated with the access network 318. Proxy 330 can include a ticketing system that generates tickets to be forwarded to a workcenter when problems or other undesired conditions are detected or otherwise known. In another embodiment, an interactive voice recognition (IVR) system can be utilized for retrieving additional information associated with the system 300, including customer reported problems, which can then be forwarded to the ticketing system for generating a ticket based on the undesired condition.

Figure 4:
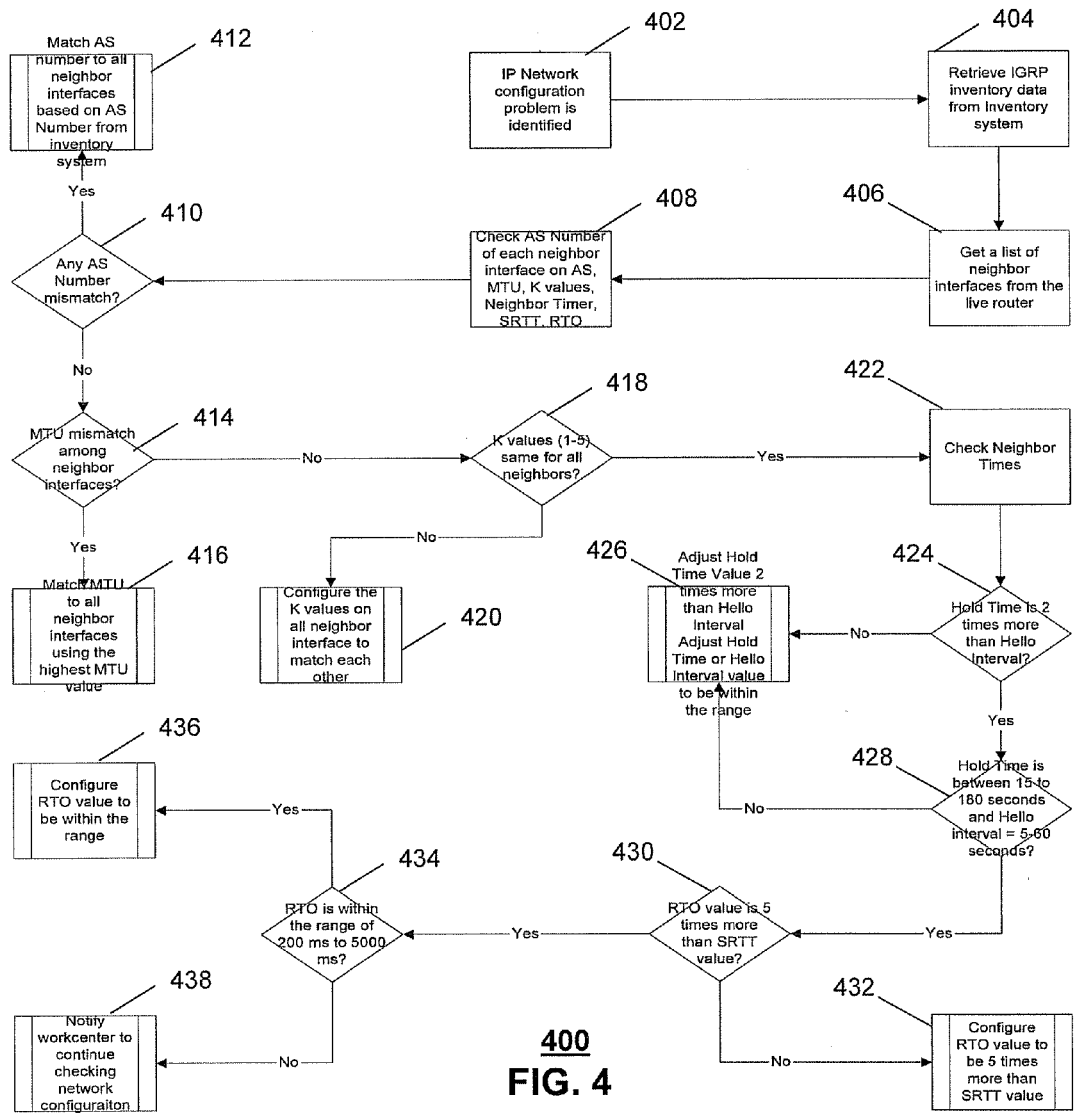
FIG. 4 depicts an illustrative embodiment of a method operating in portions of the communication systems of FIGS. 1 and 3.

FIG. 4 depicts an illustrative method 400 operating in portions of communication systems 100 and 300, including using proxy 330 to monitor, troubleshoot and adjust one or more network elements of system 300, such as provider edge routers 314. Method 400 can begin with step 402 in which a problem or undesired condition of the network is detected or becomes known. The problem can be isolated to or focused at a network element of the system, such as a provider edge router 314. Various techniques and components can be utilized for detecting the undesired condition, including monitoring devices that retrieve parameters from various network elements throughout the system. In step 404, inventory data, such as network topology, can be retrieved from the database of records or from another storage device. In step 406, the proxy 330 can determine the neighboring interfaces, such as other provider edge routers, to the problem router, including based on the inventory data. In one embodiment, the neighboring interfaced devices can be the routing devices that are directly connected to the problem router without any other routing device therebetween. In step 408, the proxy can retrieve or otherwise determine the configuration parameters associated with each of the problem router and the neighboring routers, including service provider routing identifiers (such as AS numbers), largest deliverable packet (such as MTU values), routing algorithm constants (such as K values), hold times, hello intervals, RTO values and/or SRTT values. The proxy 330 can retrieve the configuration data individually from the network elements or can retrieve the data together.

In step 410, the proxy 330 can determine if there is an AS number mismatch. If there is a mismatch then in step 412, the proxy 330 can match the problem router AS number to the value for the neighboring routers. The adjustment to the AS number can be based on an instruction transmitted from the proxy 330 to the problem router. In one embodiment, the AS numbers that are utilized for the adjustment can be based on the inventory data retrieved back in step 404. If on the other hand there is no mismatch as to AS numbers, then method 400 can proceed to step 414 to determine if there is a MTU mismatch with the neighboring network elements.

If there is a mismatch as to MTU values then in step 416, the proxy 330 can adjust and match the MTU values, such as using the highest MTU value among the problem router and neighboring routers. If on the other hand there is no mismatch as to MTU values, then method 400 can proceed to step 418 to determine if there is a K value mismatch with the neighboring network elements. The determination of the K value mismatch can be based on each of K1-K5 in the IGRP/EIGRP algorithm or can be based on only a portion of those K values.

If there is a mismatch as to K values then in step 420, the proxy 330 can adjust and match the K values, such as configuring the K values on all of the neighboring routers to match each other. In one embodiment, the mismatch of K values can be based on only the K values of the neighboring routers. If on the other hand there is no mismatch as to K values, then method 400 can proceed to steps 422, 424 and 428 to determine if there is a mismatch or undesired condition with respect to the hold time and hello intervals with the neighboring network elements. If there is a mismatch or undesired condition with respect to the hold time and hello interval then in step 426, the proxy 330 can adjust the time limits, such as increasing the hold time value to be twice as much as the hello interval.

In steps 430 and 434, the proxy 330 can determine if there is a mismatch or undesired condition with respect to the RTO and SRTT values. If there is a mismatch or undesired condition then the proxy 330 in steps 432 and 436 can adjust the RTO values, such as adjusting the RTO values to be five times as much as the SRTT values. In step 438, method 400 can notify the workcenter to continue checking the network configuration, such as where the proxy 330 has been unable to determine a mismatch or undesired condition with respect to the IGRP/EIGRP values described above.

Upon reviewing the aforementioned embodiments, it would be evident to an artisan with ordinary skill in the art that said embodiments can be modified, reduced, or enhanced without departing from the scope and spirit of the claims described below. For example, the proxy 330 can monitor and adjust for mismatches with respect to only a portion of the above-described IGRP/EIGRP values. The adjustments can be made to the problem router and/or the neighboring routers based on which of the IGRP/EIGRP values needs adjustment. In one embodiment, the adjustment can be performed by the problem and/or neighboring routers based on information received by the proxy 330. In another embodiment, the problem and/or the neighboring routers can perform one or more of the steps of method 400.

Other suitable modifications can be applied to the present disclosure without departing from the scope of the claims below. Accordingly, the reader is directed to the claims section for a fuller understanding of the breadth and scope of the present disclosure.

Figure 5:
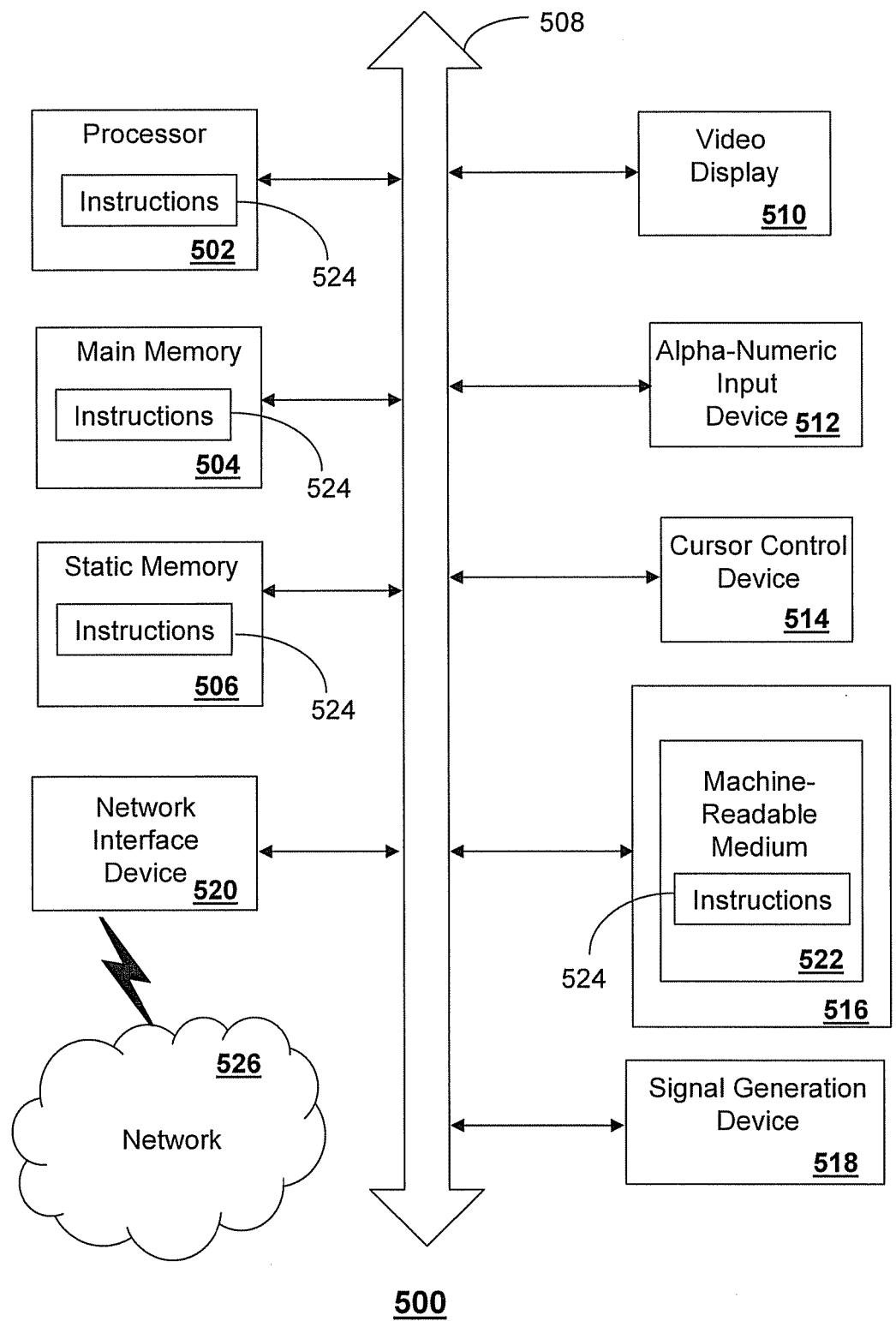
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium containing instructions 524 so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and/or magneto-optical or optical medium such as a disk or tape. Accordingly, the disclosure is considered to include any machine-readable medium, as listed herein and art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining a first interior gateway routing protocol route selection metric associated with a first router and a second interior gateway routing protocol route selection metric associated with a second router communicatively coupled to the first router, wherein the first and second interior gateway routing protocol route selection metrics comprise K1, K2, K3, K4 and K5 constants in a Bellman-Ford algorithm;
   detecting whether a mismatch exists between the first and second first interior gateway routing protocol route selection metrics, wherein detecting whether the mismatch exists is based on at least a portion of the K1, K2, K3, K4 and K5 constants;
   determining, using the Bellman-Ford algorithm, a target interior gateway routing protocol route selection metric when the mismatch is detected, wherein the target interior gateway routing protocol route selection metric comprises the K1, K2, K3, K4 and K5 constants; and
   transmitting the target interior gateway routing protocol route selection metric to at least one of the first and second routers, wherein at least one of the first and second interior gateway routing protocol route selection metrics is adjusted based on the transmitted target interior gateway routing protocol route selection metric.

2. A method as defined in claim 1, further comprising:
   obtaining a first autonomous system number associated with the first router and a second autonomous system number associated with the second router;
   detecting whether a second mismatch exists between the first and second autonomous system numbers;
   determining a target autonomous system number when the second mismatch is detected; and
   transmitting the target autonomous system number to at least one of the first and second routers.

3. A method as defined in claim 1, further comprising:
   obtaining a first maximum transmission unit value associated with the first router and a second maximum transmission unit value associated with the second router;
   detecting whether a second mismatch exists between the first and second maximum transmission unit values;

determining a target maximum transmission unit value when the second mismatch is detected; and
transmitting the target maximum transmission unit value to at least one of the first and second routers.

4. A method as defined in claim 1, further comprising:
obtaining a hold time and a hello interval associated with the second router;
comparing the hold time with the hello interval to detect an undesired time condition;
determining a target hold time when the undesired time condition is detected; and
transmitting the target hold time to the second router.

5. A method as defined in claim 1, further comprising:
obtaining a retransmission timeout and a smooth round trip time associated with the second router;
comparing the retransmission timeout with the smooth round trip time to detect an undesired time condition;
determining a target retransmission timeout when the undesired time condition is detected; and
transmitting the retransmission timeout to the second router.

6. A machine readable storage device comprising machine readable instructions that, when executed, cause a processor to perform operations comprising:
determining a first interior gateway routing protocol route selection metric associated with a first router and a second interior gateway routing protocol route selection metric associated with a second router communicatively coupled to the first router, wherein the first and second interior gateway routing protocol route selection metrics comprise K1, K2, K3, K4 and K5 constants in a Bellman-Ford algorithm;
detecting whether a mismatch exists between the first and second first interior gateway routing protocol route selection metrics, wherein detecting whether the mismatch exists is based on at least a portion of the K1, K2, K3, K4 and K5 constants;
using the Bellman-Ford algorithm to determine a target interior gateway routing protocol route selection metric when the mismatch is detected, wherein the target interior gateway routing protocol route selection metric comprises the K1, K2, K3, K4 and K5 constants; and
transmitting the target interior gateway routing protocol route selection metric to at least one of the first and second routers, wherein at least one of the first and second interior gateway routing protocol route selection metrics is adjusted based on the transmitted target interior gateway routing protocol route selection metric.

7. A machine readable storage device as defined in claim 6, wherein the operations further comprise:
obtaining a first autonomous system number associated with the first router and a second autonomous system number associated with the second router;
detecting whether a second mismatch exists between the first and second autonomous system numbers;
determining a target autonomous system number when the second mismatch is detected; and
transmitting the target autonomous system number to at least one of the first and second routers.

8. A machine readable storage device as defined in claim 6, wherein the operations further comprise:
obtaining a first maximum transmission unit value associated with the first router and a second maximum transmission unit value associated with the second router;
detecting whether a second mismatch exists between the first and second maximum transmission unit values;
determining a target maximum transmission unit value when the second mismatch is detected; and
transmitting the target maximum transmission unit value to at least one of the first and second routers.

9. A machine readable storage device as defined in claim 6, wherein the operations further comprise:
obtaining a hold time and a hello interval associated with the second router;
comparing the hold time with the hello interval to detect an undesired time condition;
determining a target hold time when the undesired time condition is detected; and
transmitting the target hold time to the second router.

10. A machine readable storage device as defined in claim 6, wherein the operations further comprise:
obtaining a retransmission timeout and a smooth round trip time associated with the second router;
comparing the retransmission timeout with the smooth round trip time to detect an undesired time condition;
determining a target retransmission timeout when the undesired time condition is detected; and
transmitting the retransmission timeout to the second router.

11. An apparatus comprising:
a route management server to:
determine a first interior gateway routing protocol route selection metric associated with a first router and a second interior gateway routing protocol route selection metric associated with a second router communicatively coupled to the first router, wherein the first and second interior gateway routing protocol route selection metrics comprise K1, K2, K3, K4 and K5 constants in a Bellman-Ford algorithm;
detect whether a mismatch exists between the first and second first interior gateway routing protocol route selection metrics, wherein detecting whether the mismatch exists is based on at least a portion of the K1, K2, K3, K4 and K5 constants;
determine, using the Bellman-Ford algorithm, a target interior gateway routing protocol route selection metric when the mismatch is detected, wherein the target interior gateway routing protocol route selection metric comprises the K1, K2, K3, K4 and K5 constants; and
transmit the target interior gateway routing protocol route selection metric to at least one of the first and second routers, wherein at least one of the first and second interior gateway routing protocol route selection metrics is adjusted based on the transmitted target interior gateway routing protocol route selection metric; and
a ticket system server to automatically generate a trouble ticket when the mismatch is detected.

12. An apparatus as defined in claim 11, wherein the route management server is to:
obtain a first autonomous system number associated with the first router and a second autonomous system number associated with the second router;
detect whether a second mismatch exists between the first and second autonomous system numbers;
determine a target autonomous system number when the second mismatch is detected; and
transmit the target autonomous system number to at least one of the first and second routers.

13. An apparatus as defined in claim 11, wherein the route management server is to:
obtain a first maximum transmission unit value associated with the first router and a second maximum transmission unit value associated with the second router;

detect whether a second mismatch exists between the first and second maximum transmission unit values;

determine a target maximum transmission unit value when the second mismatch is detected; and transmit the target maximum transmission unit value to at least one of the first and second routers.

14. An apparatus as defined in claim 11, wherein the route management server is to:

obtain a hold time and a hello interval associated with the second router;

compare the hold time with the hello interval to detect an undesired time condition;

determine a target hold time when the undesired time condition is detected; and transmit the target hold time to the second router.

15. An apparatus as defined in claim 11, wherein the route management server is to:

obtain a retransmission timeout and a smooth round trip time associated with the second router;

compare the retransmission timeout with the smooth round trip time to detect an undesired time condition;

determine a target retransmission timeout when the undesired time condition is detected; and transmit the retransmission timeout to the second router.

* * * * *